United States Patent
Gold et al.

(10) Patent No.: US 9,372,854 B2
(45) Date of Patent: Jun. 21, 2016

(54) LOAD BALANCING BACKUP JOBS IN A VIRTUALIZED STORAGE SYSTEM HAVING A PLURALITY OF PHYSICAL NODES

(75) Inventors: Stephen Gold, Fort Collins, CO (US); Jeffrey DiCorpo, San Carlos, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1061 days.

(21) Appl. No.: 12/941,996

(22) Filed: Nov. 8, 2010

(65) Prior Publication Data

US 2012/0117028 A1   May 10, 2012

(51) Int. Cl.
| | |
|---|---|
| *G06F 7/00* | (2006.01) |
| *G06F 17/00* | (2006.01) |
| *G06F 17/30* | (2006.01) |
| *G06F 11/14* | (2006.01) |
| *G06F 13/14* | (2006.01) |

(52) U.S. Cl.
CPC ...... *G06F 17/30008* (2013.01); *G06F 11/1451* (2013.01); *G06F 11/1458* (2013.01); *G06F 17/30* (2013.01); *G06F 11/1456* (2013.01); *G06F 11/1464* (2013.01); *G06F 2201/815* (2013.01)

(58) Field of Classification Search
CPC .................... G06F 17/30082; G06F 17/30094; G06F 17/30194; G06F 17/30598; G06F 17/30212; G06F 17/30575
USPC ......... 707/609, 610, 639, 662, 664, 650, 692, 707/737, 758, 770, 816, 623, 640, 654, 705, 707/651, 652, E17.032, 769, E17.01, 707/E17.046, E17.089, 644, 674, 809, 822; 711/154, 162, 127, 170; 714/4.4; 709/116–227; 718/105; 717/127
See application file for complete search history.

(56) References Cited

U.S. PATENT DOCUMENTS

| | | | |
|---|---|---|---|
| 7,567,188 B1 * | 7/2009 | Anglin ................. | G06F 3/0608 341/63 |
| 7,584,262 B1 * | 9/2009 | Wang .................. | H04L 12/4625 709/217 |
| 8,015,437 B2 * | 9/2011 | Zohar et al. ................. | 714/6.12 |
| 8,216,769 B2 * | 7/2012 | Andriessen ........... | B41C 1/1025 101/450.1 |
| 8,219,769 B1 * | 7/2012 | Wilk .................... | G06F 11/1464 707/640 |
| 8,412,896 B1 * | 4/2013 | Chellappa ........... | G06F 11/1458 707/828 |
| 2007/0220319 A1 | 9/2007 | Desai et al. | |
| 2008/0184329 A1 | 7/2008 | Cross et al. | |
| 2009/0199199 A1 | 8/2009 | Pooni et al. | |
| 2011/0231362 A1 * | 9/2011 | Attarde ................ | G06F 11/3442 707/609 |
| 2011/0246735 A1 * | 10/2011 | Bryant ................ | G06F 11/1448 711/162 |

FOREIGN PATENT DOCUMENTS

| | | |
|---|---|---|
| CN | 101610303 | 12/2009 |
| WO | 2010040255 | 4/2010 |

* cited by examiner

*Primary Examiner* — Usmaan Saeed
*Assistant Examiner* — Cecile Vo
(74) *Attorney, Agent, or Firm* — Trenner Law Firm, LLC

(57) ABSTRACT

Systems and methods of load balancing backup jobs in a virtualized storage system having a plurality of physical nodes are disclosed. An example of a method includes receiving a backup job from a client for data on a plurality of virtualized storage nodes presented to the client as a single object. The method also includes identifying at least one property of the backup job. The method also includes directing incoming data for the backup job to a particular one of the plurality of virtualized storage nodes, selection of the particular one of the plurality of virtualized storage nodes based on the at least one property of the backup job.

20 Claims, 3 Drawing Sheets

LOAD BALANCING BACKUP JOBS IN A VIRTUALIZED STORAGE SYSTEM HAVING A PLURALITY OF PHYSICAL NODES

BACKGROUND

Storage devices commonly implement data backup operations using virtual storage products for data recovery. Some virtual storage products have multiple backend storage devices that are virtualized so that the storage appears to a client as discrete storage devices, while the backup operations may actually be storing data across a number of the physical storage devices.

Deduplication is a known technique which reduces the storage capacity needed to store backup data as compared to other backup techniques. In a deduplication example, each backup job (or portion of a backup job) stored on the virtual tape may be held in a different deduplication store, and each deduplication store may further be held in a different storage node. In order to access data for the restore operation, since different sections of the virtual cartridge may be in different deduplication stores, the virtual drive may need to search non-contiguous storage blocks and/or move to different nodes as the restore operation progresses through the virtual cartridge. While non-deduplication schemes are faster, deduplication consumes less storage space.

The user may decline to use capacity-saving backup scheme, such as deduplication, in such virtualized storage environments. Alternatively, the user may partition the backup device into different targets (e.g., different virtual libraries), such that different backup retention times are grouped together. Unfortunately, this policy increases the user administration load because now the user cannot just simply direct all backups to a single backup target, and instead has to direct each backup job to the appropriate target.

Forcing the user to choose between using capacity-saving backup schemes, such as deduplication, or having to perform more administrative tasks, is counter to the value proposition of an enterprise backup device where the goal is to reduce disk space consumption and reduce or altogether eliminate user administration tasks.

DETAILED DESCRIPTION

Figure 1:
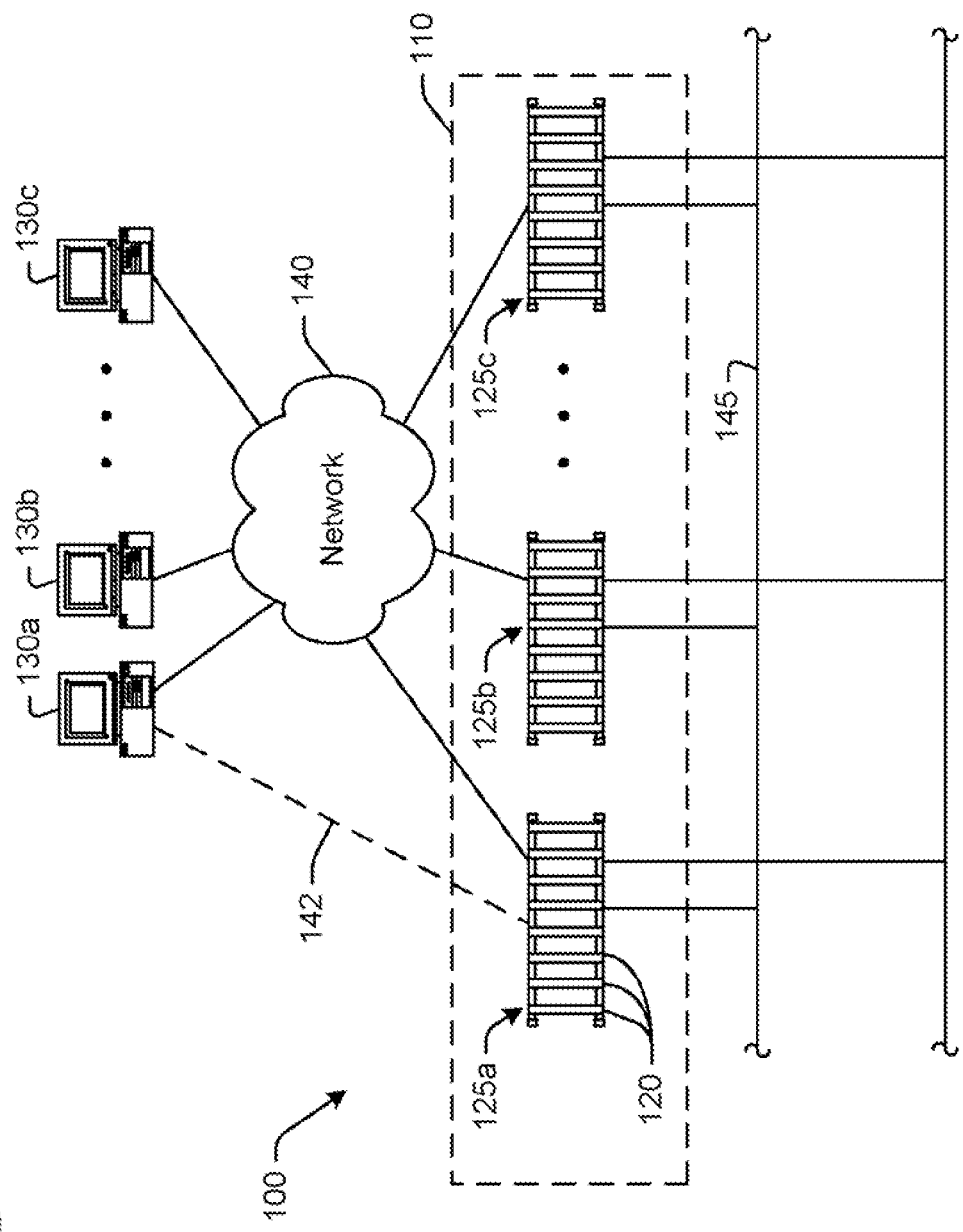
FIG. 1 is a high-level diagram showing an example of a storage system including a plurality of virtualized storage nodes which may be utilized to load balance backup jobs.

Systems and methods are disclosed for load balancing backup jobs in a virtualized storage system having a plurality of different physical nodes, for example, during backup and restore operations for an enterprise. It is noted that the term "backup" is used herein to refer to backup operations including echo-copy and other proprietary and non-proprietary data operations now known or later developed. Briefly, a storage system is disclosed including a plurality of physical storage nodes. The physical storage nodes are virtualized as one or more virtual storage devices (e.g., a virtual storage library having virtual data cartridges that can be accessed by virtual storage drives). Data may be backed-up to a virtual storage device presented to the client on the "frontend" as discrete storage devices (e.g., data cartridges). However, the data for a discrete storage device may actually be stored on the "backend" on any one or more of the physical storage devices.

The systems and methods described herein enable a user (e.g., an administrator or other user) and/or a backup application to assign properties for backup jobs (e.g., metadata specifying the type of backup job, etc.) for use by the backup device in determining how to handle the backup job. For example, incoming backup streams may be decoded to read information in meta-data embedded in the backup streams. In another example, such as with the open storage (OST) backup protocol, the information may be determined from image metadata directly from an image. In any event, the backup device may load balance backup jobs in a virtualized storage system having a plurality of different physical nodes, such that similar or related backup jobs are grouped together (e.g., on the same physical node) to enhance backup operations utilizing capacity-saving schemes such as deduplication. Furthermore, the backup device may be utilized for leveling capacity across the plurality of virtualized storage nodes by moving similar or related backup jobs to the same physical node (e.g., as capacity becomes available).

In an embodiment, a system is provided which satisfies service level objectives for different backup jobs. The system includes an interface between a plurality of virtualized storage nodes and a client. The interface is configured to identify at least one property of a backup job from the client for backing up data on a virtualized storage node. The system also includes a load balancer operatively associated with the interface. The load balancer is configured to store incoming data for the backup job on a same one of the plurality of virtualized storage nodes based on the at least one property of the backup job.

The systems and methods described herein enable a user to intelligently control how backup data is stored on the backup device. Backup jobs can be grouped and stored on the same physical node, either during initial writing of the backup job, or later when capacity becomes available. Accordingly, users do not need to partition the storage device into multiple smaller targets for each retention scheme.

FIG. 1 is a high-level diagram showing an example of a storage system including a plurality of virtualized storage nodes which may be utilized to load balance backup jobs. Storage system 100 may include a storage device 110 with one or more storage nodes 120. The storage nodes 120, although discrete (i.e., physically distinct from one another), may be logically grouped into one or more virtual devices 125a-c (e.g., a virtual library including one or more virtual cartridges accessible via one or more virtual drive).

For purposes of illustration, each virtual cartridge may be held in a "storage pool," where the storage pool may be a collection of disk array logical unit identifiers (LUNs). There can be one or multiple storage pools in a single storage product, and the virtual cartridges in those storage pools can be loaded into any virtual drive. A storage pool may also be shared across multiple storage systems.

The virtual devices 125a-c may be accessed by one or more client computing device 130a-c (also referred to as "clients"), e.g., in an enterprise. In an embodiment, the clients 130a-c may be connected to storage system 100 via a "front-end" communications network 140 and/or direct connection (illustrated by dashed line 142). The communications network 140 may include one or more local area network (LAN) and/or wide area network (WAN) and/or storage area network (SAN). The storage system 100 may present virtual devices 125a-c to clients via a user application (e.g., in a "backup" application).

The terms "client computing device" and "client" as used herein refer to a computing device through which one or more users may access the storage system 100. The computing devices may include any of a wide variety of computing systems, such as stand-alone personal desktop or laptop computers (PC), workstations, personal digital assistants (PDAs), mobile devices, server computers, or appliances, to name only a few examples. Each of the computing devices may include memory, storage, and a degree of data processing capability at least sufficient to manage a connection to the storage system 100 via network 140 and/or direct connection 142.

In an embodiment, the data is stored on more than one virtual device 125, e.g., to safeguard against the failure of any particular node(s) 120 in the storage system 100. Each virtual device 125 may include a logical grouping of storage nodes 120. Although the storage nodes 120 may reside at different physical locations within the storage system 100 (e.g., on one or more storage device), each virtual device 125 appears to the client(s) 130a-c as individual storage devices. When a client 130a-c accesses the virtual device 125 (e.g., for a read/write operation), an interface coordinates transactions between the client 130a-c and the storage nodes 120.

The storage nodes 120 may be communicatively coupled to one another via a "back-end" network 145, such as an inter-device LAN. The storage nodes 120 may be physically located in close proximity to one another. Alternatively, at least a portion of the storage nodes 120 may be "off-site" or physically remote from the local storage device 110, e.g., to provide a degree of data protection.

The storage system 100 may be utilized with any of a wide variety of redundancy and recovery schemes for storing data backed-up by the clients 130. Although not required, in an embodiment, deduplication may be implemented for migrating. Deduplication has become popular because as data growth soars, the cost of storing data also increases storage capacity, especially for backup data on disk. Deduplication reduces the cost of storing multiple backups on disk. Because virtual tape libraries are disk-based backup devices with a virtual file system and the backup process itself tends to have a great deal of repetitive data, virtual cartridge libraries lend themselves particularly well to data deduplication. In storage technology, deduplication generally refers to the reduction of redundant data. In the deduplication process, duplicate data is deleted, leaving only one copy of the data to be stored. Accordingly, deduplication may be used to reduce the required storage capacity because only unique data is stored. That is, where a data file is conventionally backed up X number of times, X instances of the data file are saved, multiplying the total storage space required by X times. In deduplication, however, the data file is only stored once, and each subsequent time the data file is simply referenced back to the originally saved copy.

With a virtual cartridge device that provides storage for deduplication, the net effect is that, over time, a given amount of disk storage capacity can hold more data than is actually sent to it. For purposes of example, a system containing 1 TB of backup data which equates to 500 GB of storage with 2:1 data compression for the first normal full backup. If 10% of the files change between backups, then a normal incremental backup would send about 10% of the size of the full backup or about 100 GB to the backup device. However, only 10% of the data actually changed in those files which equates to a 1% change in the data at a block or byte level. This means only 10 GB of block level changes or 5 GB of data stored with deduplication and 2:1 compression. Over time, the effect multiplies. When the next full backup is stored, it will not be 500 GB, the deduplicated equivalent is only 25 GB because the only block-level data changes over the week have been five times 5 GB incremental backups. A deduplication-enabled backup system provides the ability to restore from further back in time without having to go to physical tape for the data.

With multiple nodes (with non-shared back-end storage) each node has its own local storage. A virtual library spanning multiple nodes means that each node contains a subset of the virtual cartridges in that library (for example each node's local file system segment contains a subset of the files in the global file system). Each file represents a virtual cartridge stored in a local file system segment which is integrated with a deduplication store. Pieces of the virtual cartridge are contained in different deduplication stores based on references to other duplicate data in other virtual cartridges.

The deduplicated data, while reducing disk storage space, can take longer to complete a restore operation because deduplication means that common data is shared between multiple separate virtual cartridges. So when restoring any one virtual cartridge, the data may not be stored in one large sequential section of storage, but instead can be spread around in small pieces (because whenever a new backup is written, the common data within that backup becomes a reference to a previous backup, and following these references during a restore means going to the different storage locations for each piece of common data). Having to move from one storage location to another random location is slower because it requires the disk drives to seek to the different locations rather than reading large sequential sections. Therefore, it is desirable to maintain "chunks" of data for similar or related backup jobs on the same physical node.

The systems and methods described herein enable the backup device to load balance backup jobs in a virtualized storage system having a plurality of different physical nodes. Such systems and methods satisfy service level objectives for different backup jobs in virtualized storage nodes, as will be better understood by the following discussion and with reference to FIGS. 2 and 3.

Figure 2:
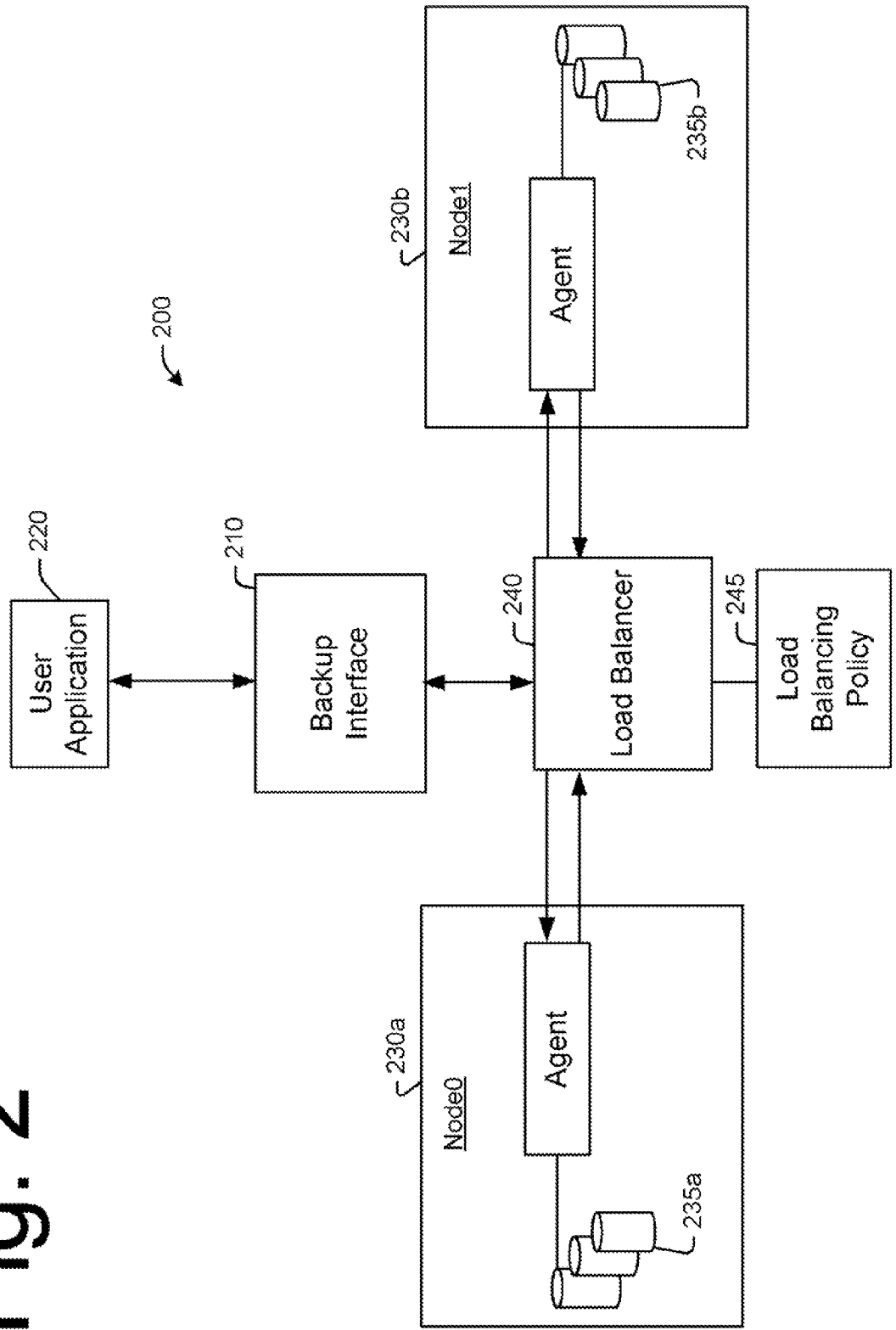
FIG. 2 illustrates an example of software architecture which may be implemented for load balancing backup jobs in a virtualized storage system having a plurality of different physical nodes.

FIG. 2 shows an example software architecture 200 which may be implemented for load balancing backup jobs in a virtualized storage system having a plurality of different physical nodes (e.g., storage system 100 shown in FIG. 1). It is noted that the components shown in FIG. 2 are provided only for purposes of illustration and are not intended to be limiting. For example, although only two virtualized storage nodes (Node0 and Node1) are shown in FIG. 2 for purposes of illustration, there is no practical limit on the number of virtualized storage nodes which may be utilized.

It is also noted that the components shown and described with respect to FIG. 2 may be implemented in program code (e.g., firmware and/or software and/or other logic instructions) stored on one or more computer readable medium and executable by one or more processor to perform the operations described below. The components are merely examples of various functionality that may be provided, and are not intended to be limiting.

In an embodiment, the software architecture 200 may comprise a backup interface 210 operatively associated with a user application 220 (such as a backup application) executing on or in association with the client (or clients). The backup interface 210 may be provided on the storage device itself (or operatively associated therewith), and is configured to identify at least one property of a backup job as the backup job is being received at the storage device from the client (e.g., via user application 220) for backing up data on one or more virtualized storage node 230a-b each including storage 235a-b, respectively. A load balancer 240 for storing/restoring and/or otherwise handling data is operatively associated with the backup interface 210.

The load balancer 240 is configured to select a destination node, based on a load balancing policy. The load balancer may be part of the storage devices itself, or implemented as an external agent. In an example, the load balancer 240 applies a load balancing policy 245 that stores similar or related backup jobs (as determined based on the property or properties of the backup job) on the same physical node (e.g., node 230a). In one example, all of the deduplicated data for the same and all similar backup jobs are stored on the same physical nodes. In another example, however, substantially all of the deduplicated data for the same and substantially all similar backup jobs are stored on the same, or as few different, physical nodes. Accordingly, the data can be restored faster than if "chunks" of deduplicated data were spread across a large number of different physical nodes.

During operation, the backup interface 210 identifies at least one property of the backup jobs so that data for the backup job may be stored on the appropriate storage node. The backup property may include one or more of the following: a name of a client device (e.g., Server1 or Server2), a name of the backup job (e.g., Daily or Weekly), a type of the backup job (e.g., full or incremental), an origin of the backup job (e.g., High Priority Server or Low Priority Server), to name only a few examples. Of course these backup properties are provided merely as illustrative of different backup properties which may be implemented. Other suitable backup properties may also be defined based on any of a wide variety of considerations (e.g., corporate policy, recommendations of the manufacturer or IT staff, etc.).

The load balancing policy may be defined based on one or more of the backup properties. For example, the load balancing policy may include instructions for routing high priority backup jobs to different nodes than lower priority backup jobs. Of course the load balancing policies may be more detailed, for example, wherein if a first condition is met, then another backup property is analyzed to determine if a nested condition is met, and so forth, in order to store the backup job (or portion of the backup job) on the appropriate storage node.

The backup device is configured to obtain at least some basic level of awareness of the backup jobs being stored, in terms of backup property (or properties). One example for providing this awareness is with the OST backup protocol, where backup properties are encoded in the meta-data provided by the OST interface whenever a new backup image is sent to the backup device. Thus, whenever an OST image (with metadata) is sent to the backup device, this serves as a trigger for analyzing the backup jobs and applying the load balancing policy. In another example, using a virtual tape model, the device may "in-line decode" the incoming backup streams to locate the property or properties of the backup job from the meta-data embedded in the backup stream by the backup application.

In one example, the backup data is formatted according to an object-based backup scheme. According to the object-based backup scheme, metadata for the backup job describes information about the backup, but not the actual files. Accordingly, the load balancer is configured for gross-level load balancing. The gross-level load balancing scheme uses high-level information about the backup job (e.g., policy name and client name), instead of individual file information, to characterize the backup job.

Instead of, or in addition to, using a load balancing policy, the load balancer itself may be configured to query a deduplication database for information about prior backup jobs for directing a current backup job. The load balancer may be further configured to direct the current backup job based only on available resources if querying the deduplication database indicates no prior backup jobs related to the current backup job. The load balancer may also be further configured to add a new entry to the deduplication database with information about the current backup job after directing the current backup job, and to delete an entry from the deduplication database when a corresponding object expires.

The following example is provided to illustrate a gross load balancing scheme. In this example, the load balancer contacts the storage device and queries the image database maintained inside the storage device. The image database stores information about the backup images that are being held in which deduplication stores, and which deduplication stores are held on which physical nodes.

If the database query indicates that similar images are already held in a deduplication store (e.g., a match is made based on client name or policy name) then the load balancer creates the image file in the global file system but physically locates the image on the selected deduplication store's file system segment.

If the database query does not return a match for a particular image, (i.e., the new backup has no related versions already stored), then the load balancer picks a node and deduplication store based on available resources. The load balancer takes into account which nodes have spare performance (e.g., the nodes that have the least number of backup jobs running) and spare capacity to accommodate the new backup job. The load balancer may then select a physical node for the new (first generation) backup job based on the node that has the least used resources overall (e.g., combining the available resources with the available capacity). The load balancer then creates a new deduplication store for that backup job on the selected node so that subsequent generations of that backup are routed to that same deduplication store. The load balancer also creates the image file in the global file system, but physically located on the selected node's deduplication store file system segment.

The load balancer also add a new entry to the image database to identify the new image file and which deduplication store the back up job has been directed to. When the load balancer starts writing the image data to the plugin, the load balancer directs the writes to the file system segment that contains that file so that writes go directly to the deduplication store without having to be transferred internally from node to node (which would impair performance).

When the load balancer expires an image (e.g., the image is deleted) then the load balancer deletes the image file from the file system. This triggers space reclamation in the deduplication store containing that file, and triggers an update to the image database to remove that image.

For restores, the load balancer may also be implemented to route the restore request to the appropriate physical storage node so that the data being restored from that node is held on the corresponding node's local disk storage. In other words, the restores are routed in the same way as backups to route to the node that already holds that backup in its deduplication store.

Such a gross load balancing system avoids the need to perform CPU-intensive deduplication processing in the client's media servers because the query to an image database is lightweight and transparent to the user. The system provides the ability to deploy a multi-node deduplication system without needing a multi-node deduplication algorithm within the storage device itself. Instead, the system can be implemented with multiple stand-alone nodes, each with their own local single-node deduplication store(s).

The load balancer may be further configured to rebalance backup jobs already stored on the plurality of virtualized storage nodes. Rebalancing backup jobs may be by migrating existing backup jobs from one physical node to another physical node, for example, to aggregate data for related or similar backup jobs that had to be stored on different physical nodes due to resource limits during storing of the initial backup job, but for which resources have since been made available.

In one example, rebalancing may include moving groups or sets of related backup images from one node to another (e.g., via inter-node LAN links between the physical storage nodes) to balance the disk capacity. One embodiment is to take all backup jobs from the same client and route those backup jobs to their own deduplication store. Thus, the entire deduplication store for that client is moved to a different node to balance capacity. This reduces the amount of data being migrated, because the data is already compressed and deduplicated before it is moved from one node to another node. When a deduplication store is moved to a different node, the image database is updated to reflect the node where the deduplication store is now maintained.

Before continuing, it is noted that although implemented as program code, the components described above with respect to FIG. 2 may be operatively associated with various hardware components for establishing and maintaining a communications links, and for communicating the data between the storage device and the client, and for carrying out the operations described herein.

It is also noted that the software link between components may also be integrated with deduplication and/or other replication technologies. In use, the user can set up replication and/or migration and run these jobs in a user application (e.g., the "backup" application) to replicate and/or migrate data in a virtual cartridge. While the term "backup" application is used herein, any application that supports the desired storage operations may be implemented.

Although not limited to any particular usage environment, the ability to better handle backup jobs is particularly desirable in a service environment where a single virtual storage product may be shared by multiple users (e.g., different business entities), and each user can determine whether to add a backup job to the user's own virtual cartridge library within the virtual storage product.

In addition, any of a wide variety of storage products may also benefit from the teachings described herein, e.g., files sharing in network-attached storage (NAS) or other backup devices. In addition, the remote virtual library (or more generally, "target") may be physically remote (e.g., in another room, another building, offsite, etc.) or simply "remote" relative to the local virtual library.

Variations to the specific implementations described herein may be based on any of a variety of different considerations, such as, but not limited to, storage limitations, corporate policies, or as otherwise determined by the user or recommended by a manufacturer or service provider.

Figure 3:
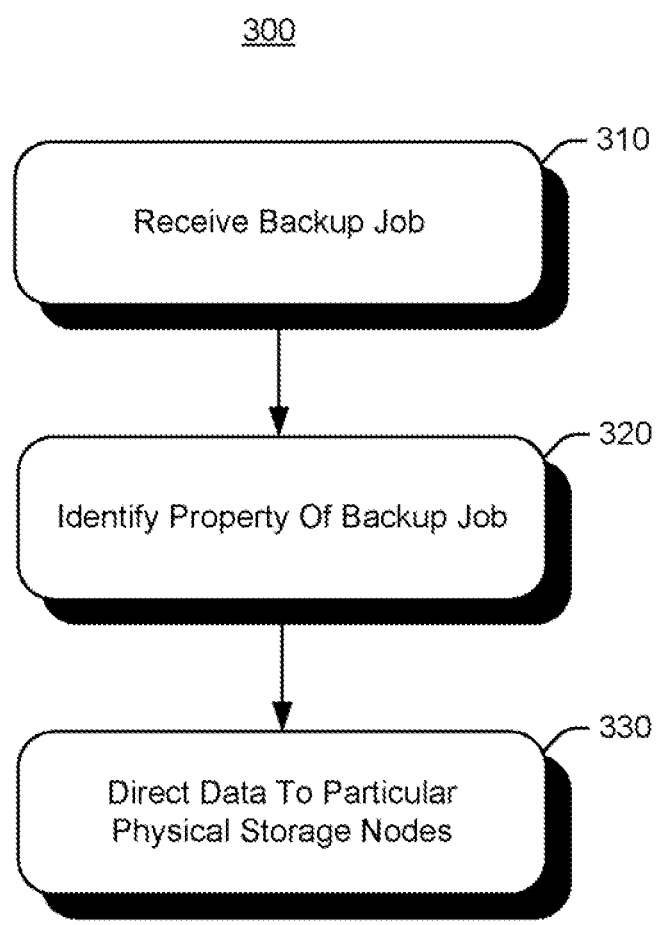
FIG. 3 is a flow diagram illustrating operations which may be implemented for load balancing backup jobs in a virtualized storage system having a plurality of different physical nodes.

FIG. 3 is a flow diagram 300 illustrating operations which may be implemented for load balancing backup jobs in a virtualized storage system having a plurality of different physical nodes. Operations described herein may be embodied as logic instructions on one or more computer-readable medium. When executed by one or more processor, the logic instructions cause a general purpose computing device to be programmed as a special-purpose machine that implements the described operations.

In operation 310, a backup job is received from a client for data on a virtualized storage node presented to the client as a single object. In operation 320, at least one property of the backup job is identified. In operation 330, incoming data for the backup job is directed to a particular one of the plurality of virtualized storage nodes. Selection of the particular one of the plurality of virtualized storage nodes is based on the at least one property of the backup job.

It is noted that this load balancing policy may be the only load balancing policy provided for all backup jobs. Alternatively, multiple load balancing policies may be provided. For example, the load balancing policies may be time-based (e.g., load balancing policies for times of day, or days of the week), or load balancing policies for different clients (e.g., high-priority servers versus low-priority servers), and so forth.

Other operations (not shown in FIG. 3) may also be implemented in other embodiments. For example, further operations may include comparing the at least one property of the backup job to available resources for directing incoming data for the backup job. Operations may also include storing data for the backup job on a same one of the virtualized storage nodes where data for a related backup job is already stored. Operations may also include grouping similar types of backup jobs on the same one of the virtualized storage nodes.

By way of further illustration, operations may also include leveling capacity across the plurality of virtualized storage nodes by moving similar types of backup jobs to the same one of the virtualized storage nodes. Leveling capacity may also include moving similar types of backup jobs is after capacity becomes available on the same one of the virtualized storage nodes. Leveling capacity may also include moving similar types of backup jobs is time-based. Leveling capacity may also include moving similar types of backup jobs is to a new one of the virtualized storage nodes.

The operations enable intelligent control over what backup data is stored on particular physical storage nodes in the virtualized storage system. Accordingly, users can meet their service level objectives.

The embodiments shown and described are provided for purposes of illustration and are not intended to be limiting. Still other embodiments of using different storage tiers based on a load balancing policy (or policies) are also contemplated which may satisfy service level objectives for different backup jobs.

The invention claimed is:

1. A method of load balancing backup jobs in a virtualized storage system having a plurality of physical nodes, comprising:
   receiving a backup job from a client for data on a plurality of virtualized storage nodes presented to the client as a single object;
   identifying at least one property of the backup job by decoding the at least one property encoded in incoming backup streams; and
   directing incoming data for the backup job to a particular one of the plurality of virtualized storage nodes based on a load balancing policy, selection of the particular one of the plurality of virtualized storage nodes by comparing the at least one property of the backup job with the load balancing policy.

2. The method of claim 1, further comprising comparing the at least one property of the backup job to available resources for directing incoming data for the backup job.

3. The method of claim 1, further comprising storing data for the backup job on a same one of the virtualized storage nodes where data for a related backup job is already stored.

4. The method of claim 1, further comprising grouping similar types of backup jobs on the same one of the virtualized storage nodes.

5. The method of claim 1, further comprising leveling capacity across the plurality of virtualized storage nodes by moving similar types of backup jobs to the same one of the virtualized storage nodes.

6. The method of claim 5, wherein moving similar types of backup jobs is after capacity becomes available on the same one of the virtualized storage nodes.

7. The method of claim 5, wherein moving similar types of backup jobs is time-based.

8. The method of claim 5, wherein moving similar types of backup jobs is to a new one of the virtualized storage nodes.

9. A backup system comprising:
a processor; and
a non-transitory computer readable storage, comprising code executable by the processor, the code comprising:
an interface between a plurality of virtualized storage nodes and a client, the interface configured to identify at least one property of a backup job from the client for backing up data on a virtualized storage by analyzing the backup job for the at least one property; and
a load balancer operatively associated with the interface, the load balancer configured to store incoming data for the backup job on a same one of the plurality of virtualized storage nodes based on the at least one property of the backup job and a load balancing policy defined based on the at least one property of the backup job.

10. The system of claim 9, wherein the backup data is formatted according to an object-based backup scheme, wherein metadata for the backup job describes information about the backup job and does not include actual files.

11. The system of claim 9, wherein the load balancer is further configured for a gross-level load balancing scheme using high-level information about the backup job instead of individual file information to characterize the backup job.

12. The system of claim 11, wherein the gross-level load balancing scheme uses policy name and client name to characterize the backup job.

13. The system of claim 9, wherein the load balancer is further configured to query a deduplication database for information about prior backup jobs for directing a current backup job.

14. The system of claim 13, wherein the load balancer is further configured to direct the current backup job based only on available resources if querying the deduplication database indicates no prior backup jobs related to the current backup job.

15. The system of claim 13, wherein the load balancer is further configured to add a new entry to the deduplication database with information about the current backup job after directing the current backup job, and to delete an entry from the deduplication database when a corresponding object expires.

16. The system of claim 13, wherein the load balancer is further configured to rebalance backup jobs already stored on the plurality of virtualized storage nodes.

17. A backup system comprising:
a processor; and
a non-transitory computer readable storage, comprising code executable by the processor, the code to direct the processor to:
identify at least one property of a backup job from a client for data to be stored on at least one of a plurality of virtualized storage nodes, the identifying by in-line decoding of incoming backup streams to locate the at least one property in meta-data embedded in the backup streams by a backup application: and
direct incoming data for the backup job to a particular one of the plurality of virtualized storage nodes based on the at least one property of the backup job satisfying nested conditions in a load balancing policy.

18. The system of claim 17, wherein the processor is further executable to rebalance backup jobs already stored on the plurality of virtualized storage nodes.

19. The system of claim 17, wherein the processor is further executable to group deduplication data for related backup jobs on the same physical storage node.

20. The system of claim 17, wherein the processor is further executable to group deduplication data for related backup jobs based on available resources.

* * * * *